(12) United States Patent
Paterra et al.

(10) Patent No.: US 11,063,915 B1
(45) Date of Patent: Jul. 13, 2021

(54) CLUSTER OF NETWORK-ATTACHABLE STORAGE DEVICES WITH CLUSTER MANIFEST

(71) Applicant: Amazon Technologies, Inc., Seattle, WA (US)

(72) Inventors: Frank Charles Paterra, Kirkland, WA (US); Eric Neilsen, Lynnwood, WA (US); Elodie Wun, Seattle, WA (US); Mahadeva Navali Basavaraj, Redmond, WA (US); Shuo Yang, Seattle, WA (US); Vaibhav Tyagi, Seattle, WA (US); Xiao Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1043 days.

(21) Appl. No.: 15/469,363

(22) Filed: Mar. 24, 2017

(51) Int. Cl.
| | |
|---|---|
| *H04L 29/06* | (2006.01) |
| *G06F 3/06* | (2006.01) |
| *H04L 9/14* | (2006.01) |
| *H04L 9/06* | (2006.01) |
| *H04L 9/32* | (2006.01) |
| *H04L 9/08* | (2006.01) |

(52) U.S. Cl.
CPC ........ *H04L 63/0428* (2013.01); *G06F 3/0604* (2013.01); *G06F 3/067* (2013.01); *G06F 3/0647* (2013.01); *H04L 9/0618* (2013.01); *H04L 9/085* (2013.01); *H04L 9/0819* (2013.01); *H04L 9/14* (2013.01); *H04L 9/3247* (2013.01); *H04L 9/3263* (2013.01)

(58) Field of Classification Search
CPC ..... H04L 63/0428; H04L 9/0618; H04L 9/14; H04L 9/3247
USPC .......................................................... 713/153
See application file for complete search history.

(56) References Cited

U.S. PATENT DOCUMENTS

| | | | | |
|---|---|---|---|---|
| 7,813,822 | B1 * | 10/2010 | Hoffberg | .......... H04N 21/44222 700/94 |
| 8,261,033 | B1 | 9/2012 | Slik et al. | |
| 9,448,614 | B2 | 9/2016 | Slik | |
| 2008/0025513 | A1 * | 1/2008 | Lietzke | ................. H04L 9/0897 380/277 |
| 2009/0287837 | A1 * | 11/2009 | Felsher | .................. G06Q 10/10 709/229 |

(Continued)

*Primary Examiner* — Thanhnga B Truong
*Assistant Examiner* — Angela R Holmes
(74) *Attorney, Agent, or Firm* — Davis Wright Tremaine LLP

(57) ABSTRACT

A device such as a network-attachable data transfer device may be configured to operate in a cluster to coordinate the storage of data. A cluster manifest may include data and/or metadata related to devices of the cluster. In some cases, a cluster manifest may include, for each of one or more devices of a cluster: an encrypted payload; an identifier associated with the particular device; and an encrypted data entry. The encrypted payload may encode a cryptographic payload key used in part to perform storage operations. The encrypted data entry may include one or more encrypted partitions that are each decryptable by a different security module of the device. The decrypted partitions may be assembled to form a cryptographic key that may decrypt the encrypted payload. The cluster manifest may be provided to a locked device of a cluster as part of a process for unlocking the locked device.

20 Claims, 9 Drawing Sheets

(56) References Cited

U.S. PATENT DOCUMENTS

| | | | |
|---|---|---|---|
| 2010/0162036 A1* | 6/2010 | Linden | G06F 11/181 714/4.11 |
| 2012/0017084 A1* | 1/2012 | Hutton | H04L 67/06 713/165 |
| 2017/0098147 A1* | 4/2017 | Shila | G06Q 20/347 |

* cited by examiner

CLUSTER OF NETWORK-ATTACHABLE STORAGE DEVICES WITH CLUSTER MANIFEST

BACKGROUND

The growth of data storage capacity and demands of data users has far outpaced the increase of data transmission bandwidth capable of transferring large amounts of data. For example, the advent of "big data"—the collection and analysis of large data sets obtained from various sources—has further challenged the use of traditional data transmission mechanisms. The discrepancy between the growth of data storage needs and limited improvements in data transmission technologies is so great that transmitting data between one storage facility and another storage facility may be prohibitively costly (e.g., requiring costly system upgrades) or lengthy (e.g., transmission may take months or years). Physically moving storage media may leave the data on legacy hardware, which may be disadvantageous (e.g., legacy hardware may not have access to security updates).

Solutions that involve the transfer of data to portable storage devices (e.g., network-attachable data transfer devices) and shipping the portable storage device to another storage facility exist but face many challenges. The capacity of data storage devices is not limitless. When a single portable storage device has insufficient capacity, multiple portable storage devices may be used in concert. However, a customer may have challenges in performing and monitoring all the steps necessary to coordinate the use of multiple storage devices.

BRIEF DESCRIPTION OF THE DRAWINGS

Various techniques will be described with reference to the drawings, in which.

DETAILED DESCRIPTION

Figure 1:
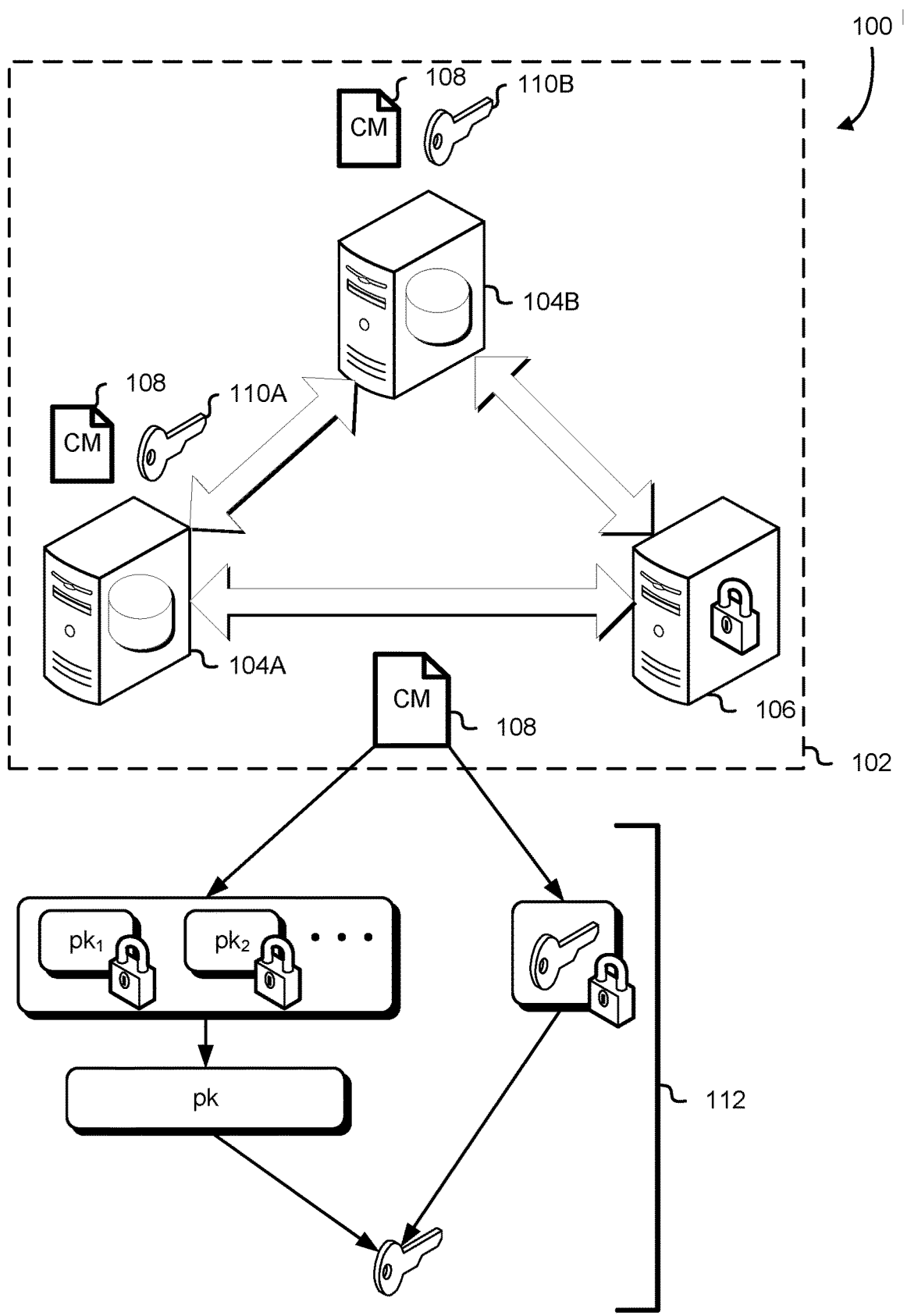
FIG. 1 shows an illustrative example of an environment in which various embodiments may be practiced.

This document describes techniques for distributing secrets for multiple devices of a cluster of devices in a shared cluster manifest and enables various types of functionality. A cluster of network-attachable data transfer devices may be configured so that the devices communicate with one another. Techniques described herein may be performed, in connection with a cluster manifest, as part of a process to unlock a cluster device that is in a locked state. A cluster of devices may refer to one or more devices that are configured to operate together, such as operating in concert to store data. For example a cluster of devices may be used to provide expanded data storage and/or processing capabilities beyond what a single storage device is capable of providing. Data and metadata relating to operation of a cluster may be distributed among the cluster devices. For example, a cluster manifest associated with the cluster may be distributed among one or more devices of the cluster. Devices described herein may be network-attachable data transfer devices.

In some embodiments, a cluster manifest includes information relating to the operation of devices within a cluster including operation settings, configuration data, network information, executable code, cryptographic material (e.g., cryptographic keys), and more. A cluster manifest may include one or more encrypted payloads, one or more identifiers, and one or more encrypted data entries. A bijective mapping may exist between the identifiers and the encrypted data entries of a cluster manifest. In some embodiments, the cluster manifest includes, for at least a subset of the cluster devices, a corresponding encrypted payload, identifier, and encrypted data entry. An identifier may refer to information that may be used to identify a particular device of a cluster. Various examples of identifiers that may be used include a globally unique identifier (GUID), universally unique identifier (UUID), media access control address, serial number, and the like. However, it should be noted that the use of an identifier may be a technical optimization that improves performance, and there exist embodiments contemplated in the scope of this disclosure where a cluster manifest does not include identifiers and/or mappings associated with identifiers. An encrypted data entry may include data that is encrypted using various techniques. In some embodiments, an encrypted data entry includes two or more encrypted partitions, each encrypted partition being encrypted using a different cryptographic key of a different security module. An encrypted data entry, when decrypted, may encode cryptographic material such as a cryptographic key. The cryptographic key encoded in an encrypted data entry may be used to decrypt an associated encrypted payload.

The device associated with an encrypted data entry may be able to use the encrypted data entry to perform an authentication process and/or obtain data. For example, consider an encrypted data entry having two partitions. In an embodiment, the device obtains the encrypted data entry and parses the encrypted data entry into a first partition and a second partition. A first security module of the device may be used to decrypt the first partition and a second security module of the device may be used to decrypt the second partition. The security modules may be configured such that cryptographic operations will fail if the device has been tampered with. As a result, successfully decrypting both partitions may be used to authenticate that the first security module and the second security module described in the above example are valid and that no tampering has occurred. When each partition of an encrypted data entry is decrypted, the decrypted partitions may be used to assemble cryptographic material such as a cryptographic key. The cryptographic key may be assembled by concatenating the decrypted partitions together, or by various other techniques described hereinbelow.

The cluster manifest may include a list of encrypted payloads. Cryptographic material obtained from an encrypted data entry may be used to decrypt, authenticate, or perform other cryptographic operations in conjunction with a corresponding encrypted payload. Each encrypted payload may be encrypted under a different cryptographic key (e.g., a cryptographic key obtained from the corresponding encrypted data entry) and may be decryptable by a particular device of the cluster.

Utilizing a cluster to perform data storage has various advantages over using a single device to perform data storage—for example, using multiple devices in a cluster configuration may increase data throughput and capacity, may increase availability (e.g., if a single device of a cluster becomes defective, operations may be offloaded to other devices in the cluster), reliability (e.g., if a single device of the cluster becomes defective, data in other devices may be unaffected by such failures), and perform load distribution functions. For example, data is partitioned into shards across multiple devices of a cluster in such a manner that individual devices of a device can each be a source for a subset of a larger set of data. For example, data from a database may be sharded across multiple cluster devices by a horizontal partitioning of data such that cluster devices are configured to each store rows of a database—such a configuration may be used to improve performance, reliability, and availability of data.

Devices of a cluster may be in a locked state or an unlocked state. A locked device may have restricted functionality such that one or more features, functions, operations, requests, etc., are not accessible to a customer. In some embodiments, a customer receives a device in a locked state and unlocks the device. A locked device may include a locked cluster manifest (e.g., an encrypted cluster manifest). In some embodiments, a customer interacts with a human interface device (HID) to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition. Embodiments in accordance with this disclosure may use any combination of the techniques described herein as part of a process for unlocking a cluster. The information provided by the customer may be used to unlock (e.g., decrypt) the locked cluster manifest and provide access to an unlocked cluster manifest.

In some cases, a customer manually unlocks each device of a cluster such as in the manner described above. However, management of a cluster may become difficult as the number of devices in a cluster grows. Furthermore, a customer may not always be available to unlock a device—for example, if a device loses power outside of normal business hours and, as a result of the power outage, enters an unlocked state, it may not be feasible and/or practical for a customer to perform a manual unlock process, and waiting until the customer is able to perform the manual unlock process may be undesirable. Therefore, it may be advantageous to be able to perform an automated authentication process that may be used to unlock a locked device of a cluster.

Devices of a cluster may be configured to perform steps to authenticate and/or unlock a locked device of a cluster. As part of an automated authentication, a device of the cluster may detect that another device of the cluster should be authenticated. In some cases, an intermittent power failure affecting the second system can cause it to reboot (e.g., power cycle) and enter a locked state. An unlocked device of the cluster may, in response to detecting the second device is in a locked state, provide an unlocked cluster manifest to the locked device. The locked device may use the cluster manifest to perform an authentication. The locked device may receive the cluster manifest and parse the manifest to obtain an encrypted payload and an encrypted data entry associated with the device—for example, by doing a look-up based on the locked device's identifier. The system may parse the encrypted data entry that may then be parsed into partitions and the partitions decrypted using one or more security modules accessible to the device, and the decryption results may be used to assemble a cryptographic key that may be used to decrypt an encrypted payload. The encrypted payload may include cryptographic material (e.g., a cryptographic payload key) that is usable to perform one or more features, functions, operations, requests, etc. The device may store the cryptographic material (e.g., cryptographic payload key) in volatile memory, provide an indication that the device has transitioned to an unlocked state, establish one or more connections with cluster devices, or some combination thereof. Cryptographic material included in the payload, such as the cryptographic payload key, may be used at least in part as of one or more processes for storing data in a secure manner (e.g., by storing the data in encrypted form).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is an illustrative example of an environment 100 in which various embodiments of the present disclosure can be practiced. In an embodiment, a cluster 102 of network-attachable data transfer devices may communicate with each other. A network-attachable data transfer device of a cluster may be in a locked or unlocked state. For example, FIG. 1 illustrates two cluster devices 104A and 104B that are in an unlocked state and a third cluster device 106 that is in a locked state. FIG. 1 further illustrates steps that may be performed, in connection with a cluster manifest, as part of a process to unlock a cluster device 106 in a locked state.

A cluster 102 of network-attachable data transfer devices may refer to one or more network-attachable data transfer devices that have a trust relationship—for example, a first device of the cluster may trust another device of the cluster to provide the cluster manifest to the first device. A cluster of devices may be configured to operate together but need not be configured to operate in coordination with each other. For example, a cluster 102 may be used to provide expanded data storage and/or processing capabilities beyond what a single device is capable of providing. Individual network-attachable data transfer devices may be configured to operate individually (e.g., without coordination with other devices) or may be configured to operate as a cluster (e.g., through coordinating storage of data and metadata in a structured manner between multiple devices of a cluster). When configured to operate as a cluster, data and metadata may be distributed between devices in a cluster. For example, devices of a cluster may include a cluster manifest 108 associated with the cluster that includes information related to operation of the device within the cluster, including operation settings, configuration data, and network information. A cluster manifest in accordance with various embodiments (such as embodiments in accordance with FIG. 1) is described in more detail below in FIG. 2.

Utilizing a cluster to perform data storage has various advantages over using a single device to perform data storage—for example, using multiple devices in a cluster configuration may increase data throughput and capacity, may increase availability (e.g., if a single network-attachable data transfer device of a cluster becomes defective, operations may be offloaded to other devices in the cluster), reliability (e.g., if a single network-attachable data transfer device of the cluster becomes defective, data in other network-attachable data transfer devices may be unaffected by such failures), and perform load distribution functions. For example, data may be partitioned into shards across multiple network-attachable data transfer devices of a cluster in such a manner that individual devices of a network-attachable data transfer device may each be a source for a subset of a larger set of data. For example, data from a database may be sharded across multiple cluster devices by a horizontal partitioning of data such that cluster devices are configured to each store rows of a database—such a configuration may be used to improve performance, reliability, and availability of data. It should be noted, as discussed above, that devices in a cluster configuration may be configured to operate together (e.g., by sharding data across multiple devices of the cluster) but need not be configured in such a manner. For example, devices of a cluster may be utilized to perform separate and/or discrete operations.

Individual network-attachable data transfer devices may be in a locked state or an unlocked state. A locked network-attachable data transfer device such as the network-attachable data transfer device 106 illustrated in FIG. 1 may have restricted functionality such that one or more features, functions, operations, requests, etc., are not accessible via a locked network-attachable data transfer device which are accessible via an unlocked network-attachable data transfer device. In some embodiments, a customer may receive a network-attachable data transfer device in a locked state and unlock the device. A locked network-attachable data transfer device may include a locked cluster manifest. In some embodiments, a customer interacts with a human interface device (HID) to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition. Embodiments in accordance with this disclosure may use any combination of the techniques described herein as part of a process for unlocking a network-attachable data transfer device. A locked network-attachable data transfer device may receive the verification data (password, PIN code, fingerprint data, etc.), perform an authentication process (e.g., verify that that the provided password matches the user account associated with the device and/or unlock), and then unlock the device. The verification data may be used as part of a decryption process where an encrypted cluster manifest is decrypted and made available for use by the system.

A cluster manifest may include an encrypted payload and encrypted data that, when decrypted, encodes a cryptographic key. The encrypted payload and the encrypted data may be associated with a particular network-attachable data transfer device of the cluster, for example, through a data structure and/or mapping. The structure of cluster manifests in accordance with various embodiments contemplated in the scope of this disclosure is described below in greater detail in connection with FIG. 2. The encrypted data associated with a network-attachable data transfer device may be decryptable using one or more security modules of the network-attachable data transfer device. In some embodiments, a first portion of the encrypted data may be decryptable by a first security module of a network-attachable data transfer device, a second portion of the encrypted data may be decryptable by a second security module of a network-attachable data transfer device, and so on, such that each portion of the encrypted data may be decrypted using a particular security module of the network-attachable data transfer device. Furthermore, in some embodiments, such as those described above, each individual security module of a network-attachable data transfer device may individually lack access to sufficient cryptographic material to obtain the cryptographic key from the encrypted data. For example, in an embodiment, a cryptographic key is partitioned into two halves, the first half is encrypted using a first security module, and the second half is encrypted using a second security module. The two encrypted halves may correspond to the encrypted data described above and may be stored in a cluster manifest as the encrypted data described above. In some embodiments, the cryptographic key is partitioned into N-parts where the number of parts is equal to the number of on-board security modules for a particular network-attachable data transfer device, and each security module is used to encrypt a corresponding partition of the cryptographic key. The cryptographic key may be re-assembled from the encrypted data by parsing the encrypted data to obtain the individual encrypted partitions, using each of the security modules to decrypt the corresponding encrypted partition and combining each of the decrypted partitions to form the cryptographic key. The cryptographic key may be used to decrypt an encrypted payload. The encrypted payload may include executable code, data, additional cryptographic material such as digital certificates and cryptographic keys, or some combination thereof. The payload, when decrypted, may be usable by the network-attachable data transfer device to perform one or more features, functions, operations, requests, and the like. In some embodiments, the decrypted payload may be required by the system to make one or more features, functions, operations, requests, etc., accessible to a customer, user, or subsystem (e.g., customer applications installed on the network-attachable data transfer device). In some embodiments, a cluster manifest may, for each network-attachable data transfer device of the cluster, include: an identifier; an encrypted payload; and encrypted data that, when decrypted, encodes a cryptographic key that may be used to decrypt the encrypted payload associated with the particular network-attachable data transfer device.

FIG. 1 illustrates an example cluster having two unlocked network-attachable data transfer devices 104A and 104B. In some embodiments, a first network-attachable data transfer device 104A has a locked cluster manifest that a customer unlocks by providing a PIN code. Upon authenticating the PIN code, the cluster manifest 108 may be obtained by the first network-attachable data transfer device 104A. The network-attachable data transfer device 104A may query the cluster manifest using its identifier to obtain an encrypted payload and encrypted data that, when decrypted, encodes a cryptographic key that may be used to decrypt the encrypted payload. The network-attachable data transfer device 104A may use one or more security modules to decrypt the encrypted data and obtain the cryptographic key that may subsequently be used to decrypt the payload. The network-attachable data transfer device 104A may then extract, from the payload associated with the network-attachable data transfer device 104A, a first cryptographic key 110A that may be used to make one or more features, functions, operations, requests, etc., accessible (e.g., to a customer). The network-attachable data transfer device 104A may then indicate that it is in an unlocked state. The network-attachable data transfer device 104A may also optionally perform steps to join a cluster network, such as detecting the existence of other cluster devices on a network and connecting to those devices using a cryptographically protected communications session such as a Transport Layer Security (TLS) session. A second network-attachable data transfer device 104B may also have a locked cluster manifest that the customer similarly unlocks—for example, using the same PIN code. However, note that in some embodiments, each network-attachable data transfer device may have a unique PIN code such that a different PIN code may be used to authenticate different devices of a cluster. The second network-attachable data transfer device 104B may query the cluster manifest for an encrypted payload and encrypted data associated with the second network-attachable data transfer device 104B, which may be separate and distinct from those obtained by the first network-attachable data transfer device 104A. Likewise, the second network-attachable data transfer device 104B may use its security modules to decrypt the encrypted data to obtain a cryptographic key using techniques described herein and obtain a cryptographic key that may be used to decrypt the encrypted payload associated with the second network-attachable data transfer device 104B. Note that the security modules of the first network-attachable data transfer device 104A may not have access to sufficient cryptographic material (e.g., cryptographic keys) to decrypt the encrypted data associated with the second network-attachable data transfer device 104B. The cryptographic key associated with the second network-attachable data transfer device 104B may be used to decrypt the encrypted payload associated with the second network-attachable data transfer device 104B and obtain a second cryptographic key 110B associated with the second network-attachable data transfer device 104B that may be used to make one or more features, functions, operations, requests, etc., accessible (e.g., to a customer). Note that different network-attachable data transfer devices of a cluster may support different features—for example, the first network-attachable data transfer device 104A may support encryption under one set of cryptographic algorithms whereas the second network-attachable data transfer device 104B may support encryption under a second, different, set of cryptographic algorithms. It should be further noted that while the cluster manifest 108 may be shared among network-attachable data transfer devices of a cluster, in some embodiments, each network-attachable data transfer device of the cluster may maintain its own cryptographic material which is not shared with other devices of the cluster. For example, the first network-attachable data transfer device 104A may keep its cryptographic key 110A internally and not share it with other devices of the cluster (or other external devices outside of the network).

In some embodiments, a customer may receive a network-attachable data transfer device and begin using the network-attachable data transfer device individually (i.e., not in a clustered mode of operation). The customer may determine, for various reasons, that an individual network-attachable data transfer device is appropriate under the circumstances—for example, the customer may determine that the data storage capacity of a single network-attachable data transfer device is sufficient for the expected use case or that under certain non-technical constraints (e.g., lack of money to order additional network-attachable data transfer devices) a network-attachable data transfer device is sufficient for the customer's needs. The customer may begin to transfer and/or collect data on the network-attachable data transfer device operating individually. At a later point in time, the customer may determine that it is appropriate to use additional network-attachable data transfer devices—for example, the data storage capacity needed for the use case exceeds the expected storage needs as well as the data storage capacity of a single network-attachable data transfer device. A customer may acquire additional network-attachable data transfer devices and provision the network-attachable data transfer devices (including the initial network-attachable data transfer device) to operate in a cluster mode while still retaining the data and analysis previously performed by the initial network-attachable data transfer device in a single-device mode of operation (i.e., operating individually as opposed to as part of a cluster).

It should be noted that in some embodiments a network-attachable data transfer device will be a member of multiple clusters. For example, a network-attachable data transfer device such as the network-attachable data transfer device 104B shown in FIG. 1 can be part of a first cluster 102 and ingest data as part of the first cluster 102 (e.g., in a first data storage partition) and simultaneously be part of a second cluster (not illustrated in FIG. 1) that includes a second set of network-attachable data transfer devices. Network-attachable data transfer devices and/or clusters may have configuration data related to the use of a device in multiple clusters. For example, a network-attachable data transfer device may be configured such that it allows or prohibits the particular device to join or be a member of multiple clusters. Likewise, a cluster may be configured (e.g., via metadata stored in the cluster manifest) to allow or prohibit devices of the particular cluster to join or be a member of another cluster. In some embodiments, a network-attachable data transfer device is configured such that, as part of joining a cluster such as the cluster 102 illustrated in FIG. 1, the network-attachable data transfer device is provisioned for use on the cluster. The provisioning of the device for use on the cluster may include erasing, deleting, reformatting, resetting, or performing other operations such that traces of previous usages of the device (e.g., programs, applications, data) from a previous use are removed.

FIG. 1 further illustrates an example cluster having a locked network-attachable data transfer device 106. In some embodiments, a customer receives a network-attachable data transfer device from a provider in a locked state. The network-attachable data transfer device may be shipped to the customer in a locked state so as to prevent the network-attachable data transfer device from being tampered with. For example, a locked network-attachable data transfer device may be limited in its functionality and not be operable to run executable code, load data, or perform other functions/features that would otherwise be possible to perform with an unlocked network-attachable data transfer device. As a result, a malicious party that may intercept the network-attachable data transfer device during shipment to the customer will be prevented from loading and running executable code such as malware (e.g., software that damages the computer system) or spyware (e.g., software that eavesdrops on the activities of a computer system on behalf of another party) on the network-attachable data transfer device. Furthermore, a customer that receives a network-attachable data transfer device in a locked state may have the opportunity to inspect the system both physically and programmatically prior to unlocking the network-attachable data transfer device and joining it to a cluster network.

In accordance with various embodiments, the locked network-attachable data transfer device 106 of the cluster 102 may perform an authentication process with information provided from an unlocked network-attachable data transfer device of the cluster 102. The result of a successful authentication process may verify that hardware of the network-attachable data transfer device (e.g., security modules) has not been tampered with and may further serve to unlock the network-attachable data transfer device (i.e., transition the network-attachable data transfer device from a locked state to an unlocked state). FIG. 1 illustrates an unlocked network-attachable data transfer device 104A providing a cluster manifest 108 to the locked network-attachable data transfer device 106 and steps that may be performed by the locked network-attachable data transfer device 106 as part of an unlocking process.

In some cases, a customer may manually unlock each network-attachable data transfer device of a cluster such as in the manner described above. However, management of a cluster may become difficult as the number of devices in a cluster grows. Furthermore, a customer may not always be available to unlock a network-attachable data transfer device—for example, if a device loses power outside of normal business hours and as a result of the power outage enters an unlocked state, it may not be feasible and/or practical for a customer to perform a manual unlock process, and waiting until the customer is able to perform the manual unlock process may be undesirable. Therefore, it may be advantageous to be able to perform an automated authentication process that may be used to unlock a locked device of a cluster.

In an embodiment, a device of the cluster in a locked state receives a cluster manifest from another device of the cluster and is able to programmatically perform an unlock process that results in the device transitioning from a locked state to an unlocked state (i.e., performed without steps that require interaction with a human customer). Furthermore, in such an embodiment, the cluster manifest is configured such that an encrypted payload associated with the locked device is only accessible (e.g., via decryption) by the particular locked device and that no other device of the cluster has access to cryptographic material sufficient to decrypt the encrypted payload. In such an embodiment, content stored in the payload is distributed to other devices of the cluster but is still kept secret from those devices.

FIG. 1 illustrates steps for performing an automated authentication 112 using devices of a cluster 102, an authentication being able to unlock a locked network-attachable data transfer device of the cluster. As part of an automated authentication 112, a device of the cluster such as the network-attachable data transfer device 104A shown in FIG. 1 may detect that another device of the cluster such as the network-attachable data transfer device 106 should be authenticated. In some cases, a local power failure may affect one system and cause it to reboot and enter a locked state. An unlocked device of the cluster such as the network-attachable data transfer device 104A may, in response, provide an unlocked cluster manifest 108 to the locked network-attachable data transfer device 106. The locked network-attachable data transfer device 106 may use the cluster manifest 108 to perform an authentication 112. The locked network-attachable data transfer device may receive the cluster manifest 108 and parse the manifest to obtain an encrypted payload and encrypted data associated with the device. The association may be stored in the manifest or may be calculated from information available to the system. The encrypted data may then be parsed and decrypted using one or more security modules of the network-attachable data transfer device 106, and the decryption results may be used to assemble a cryptographic key that the network-attachable data transfer device 106 uses to decrypt an encrypted payload. The encrypted payload may include cryptographic material (e.g., a cryptographic key) that is usable to perform one or more features, functions, operations, requests, etc. The network-attachable data transfer device 106 may store the cryptographic material in volatile memory, provide an indication that the device has transitioned to an unlocked state, establish one or more connections with cluster devices, or some combination thereof. Cryptographic material included in the payload, such as a cryptographic payload key, may be used part as of one or more processes for storing data. As discussed in greater detail below in connection with FIG. 3, a network-attachable data transfer device may include one or more persistent storage media. Data that is stored in a persistent storage medium may be subject to cryptographic operations using the cryptographic payload key. For example, in some embodiments a system performs authenticated encryption on all data that is to be stored on a network-attachable data transfer device—i.e., a request by a customer to store "123" may result in an encrypted form of the data "123" being stored in addition to a corresponding authentication tag. Of course, other cryptographic operations such as encryption-without-authentication, authentication-without-encryption, and more, may be performed in connection with the cryptographic payload key. In some embodiments, data stored on a network-attachable data transfer device is authenticated but not encrypted—for example, in some systems, data may be stored in plaintext with a corresponding message authentication code (MAC) or tag. The data may be viewable to other entities but cannot be modified without detection as the authentication tag of the modified data will not match the original data. In this way, other entities may verify that the data, which may be in plaintext, was generated by a network-attachable data transfer device having access to the cryptographic payload key. Such systems may have performance (e.g., throughput and latency) advantages over other systems as encryption operations are, generally, computationally expensive.

Figure 2:
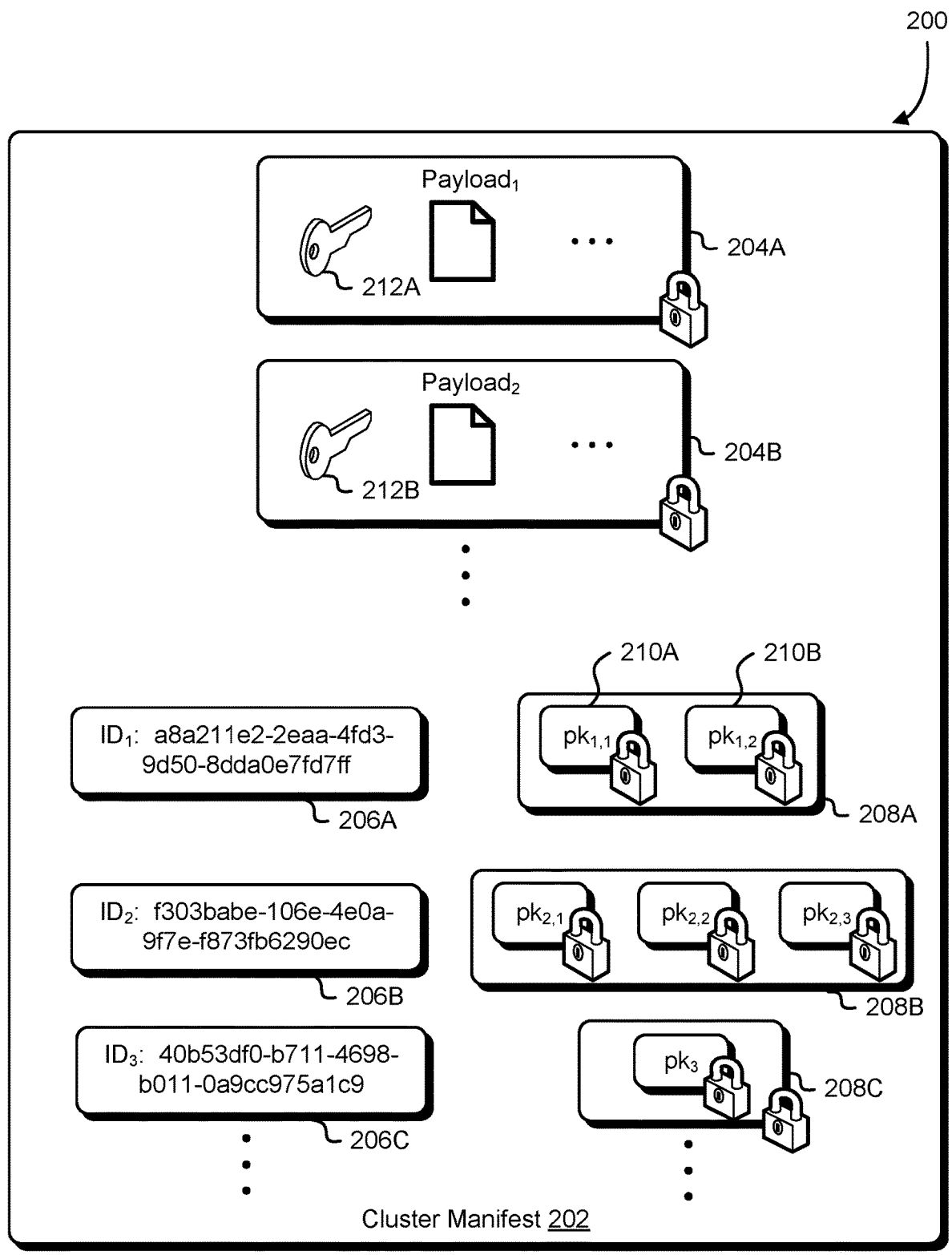
FIG. 2 shows an illustrative example of a cluster manifest in accordance with various embodiments.

FIG. 2 illustrates a diagram 200 of a cluster manifest 202 in accordance with various embodiments. The cluster manifest 202 may be a cluster manifest in accordance with those described above in connection with FIG. 1. A cluster manifest 202 may be information that is used by a cluster of devices to coordinate operations, share information, and the like. The clusters may be in accordance with clusters described above in connection with FIG. 1 and elsewhere in this disclosure. Furthermore, a cluster manifest may be used to distribute and protect secrets among devices in a cluster. A cluster manifest may include; one or more encrypted payloads 204A and 204B; one or more identifiers 206A and 206B; and one or more entries of encrypted data 208A and 208B.

An identifier may refer to information that may be used to identify a particular network-attachable data transfer device of a cluster. For example, the cluster manifest 202 shown in FIG. 2 includes a first identifier 206A and a second identifier 206B that identify different devices of the network. Various examples of identifiers that may be used include a globally unique identifier (GUID), universally unique identifier (UUID), media access control address, serial number, and the like. However, identifiers need not be unique. For example, a counter may be used to assign identifiers for devices as they join the cluster (e.g., first device of the cluster has an ID of 1, the second device has an ID of 2, and so on) and each device persists the identifier assigned to it upon being added to the cluster. In some embodiments, even if the identifier is not persisted or is lost, a device can still determine its identifier by attempting to sequentially decrypt each encrypted data entry until it successfully decrypts an entry. It should be noted in some embodiments, the manifest does not include identifiers for any devices of a cluster, includes identifiers for a strict subset of devices in a cluster, or includes identifiers for all devices in a cluster. In some embodiments, a device that was unable to locate its associated identifier walks the entire list of encrypted data entries and attempts to decrypt each entry to assemble a valid cryptographic key until it is successful.

In some embodiments, one or more entries of encrypted data is stored in a cluster manifest. In the example embodiment illustrated in FIG. 2, the cluster manifest 202 includes a mapping of an identifier to an encrypted data entry. For example, the first identifier 206A may be mapped to the first encrypted data entry 208A and the second identifier 206B may be mapped to a second encrypted data entry 208B. The mapping may be done in various ways, such as by using a data type, a data structure, and the like. For example, a C-style data structure, associative array (i.e., map), linked list, or various combinations thereof may be used to implement the mapping between an identifier and an encrypted data entry. In some embodiments, the identifiers are locally unique (e.g., each identifier is used by at most one device of a cluster) or globally unique (e.g., each identifier is unique such that one device and another device will not have the same identifier). An encrypted data entry may include one or more encrypted partitions. An encrypted data entry, when decrypted, may encode cryptographic material such as cryptographic keys, digital certificates, and more. For example, the first encrypted data entry 208A shown in FIG. 2 includes two partitions 210A and 210B. In some embodiments, the partitions of a data entry are a fixed size. In some embodiments, the partitions of all data entries in a cluster manifest are of a same fixed size. The device may be a network-attachable data transfer device in accordance with those described elsewhere in this disclosure.

The device associated with an identifier corresponding to an encrypted data entry may be able to use the encrypted data entry to perform an authentication process and/or obtain data. For example, consider the first encrypted data entry 208A shown in FIG. 2—in an embodiment, a device associated with the first identifier 206A may read the first encrypted data entry 208A and parse the encrypted data entry 208A into two partitions 210A and 210B. A first security module of the device may be used to decrypt the first partition 210A and a second security module of the device may be used to decrypt the second partition 210B. The security modules may be configured such that cryptographic operations will fail if the device has been tampered with. As a result, successfully decrypting both partitions 210A and 210B may be used to authenticate that the first security module and the second security module described in the above example are valid and that no tampering has occurred. In some embodiments, authenticated encryption may is employed such that each encrypted partition has a corresponding authentication tag.

When each partition of an encrypted data entry is decrypted, the decrypted partitions may be used to assemble cryptographic material such as a cryptographic key. The cryptographic key may be assembled by concatenating the decrypted partitions together. In some embodiments the order and/or manner in which the decrypted partitions are to be combined conform to a predetermined format (e.g., concatenated in the same order in which the encrypted partitions are ordered), in other embodiments the partitions encodes information that is used to determine how to combine the decrypted partitions (e.g., the first byte of each decrypted partition indicates an ordering), and so on. Of course, it is contemplated that the decrypted partitions may be combined in any suitable manner to encode an output (e.g., cryptographic material such as a cryptographic key).

In some embodiments, encrypted data entries have a different number of partitions and/or the sizes of partitions are different. For example, in FIG. 2, the first encrypted data entry 208A has two partitions, the second encrypted data entry 208B has three partitions, and the third encrypted data entry 208C has a single partition. In some embodiments, two or more security modules are needed in concert (i.e., used in conjunction with each other) to obtain the cryptographic material encoded in an encrypted data entry and/or partition. As an example, consider the third encrypted data entry 208C which is double-encrypted (i.e., a data input is encrypted a first time and the output of the first encryption is used as the input to a second encryption)—as part of obtaining the encoded cryptographic material $pk_3$, the device associated with the identifier 206C associated with the encrypted data entry 208C may perform a first decryption on the double-encrypted ciphertext using a first security module to obtain a first output (i.e., a single-encrypted ciphertext in this example) and then perform a second decryption on the single-encrypted ciphertext using a second security module to obtain, as the second output, the encoded cryptographic material.

The cluster manifest may include a list of encrypted payloads. Cryptographic material obtained from an encrypted data entry may be used to decrypt, authenticate, or perform other cryptographic operations in conjunction with a corresponding encrypted payload. Each encrypted payload may be encrypted under a different cryptographic key (e.g., a cryptographic key obtained from the corresponding encrypted data entry) and may be decryptable by a particular device of the cluster. For example, the first encrypted payload 204A shown in FIG. 2 may be decryptable by a first device of the cluster that obtains a cryptographic key from a corresponding encrypted data entry 208A and the second encrypted payload 204B shown in FIG. 2 may be decryptable by a second (i.e., different) device of the cluster that obtains a cryptographic key from a corresponding encrypted data entry 208B. An encrypted payload may include various types of data, such as executable code, cryptographic material (e.g., cryptographic keys, digital certificates), data, and the like. In some embodiments, an encrypted payload includes a cryptographic key that is used by a network-attachable data transfer device (such as those described above in connection with FIG. 1) to perform various operations. A network-attachable data transfer device may be unlocked when it obtains the cryptographic key included in the payload.

Figure 3:
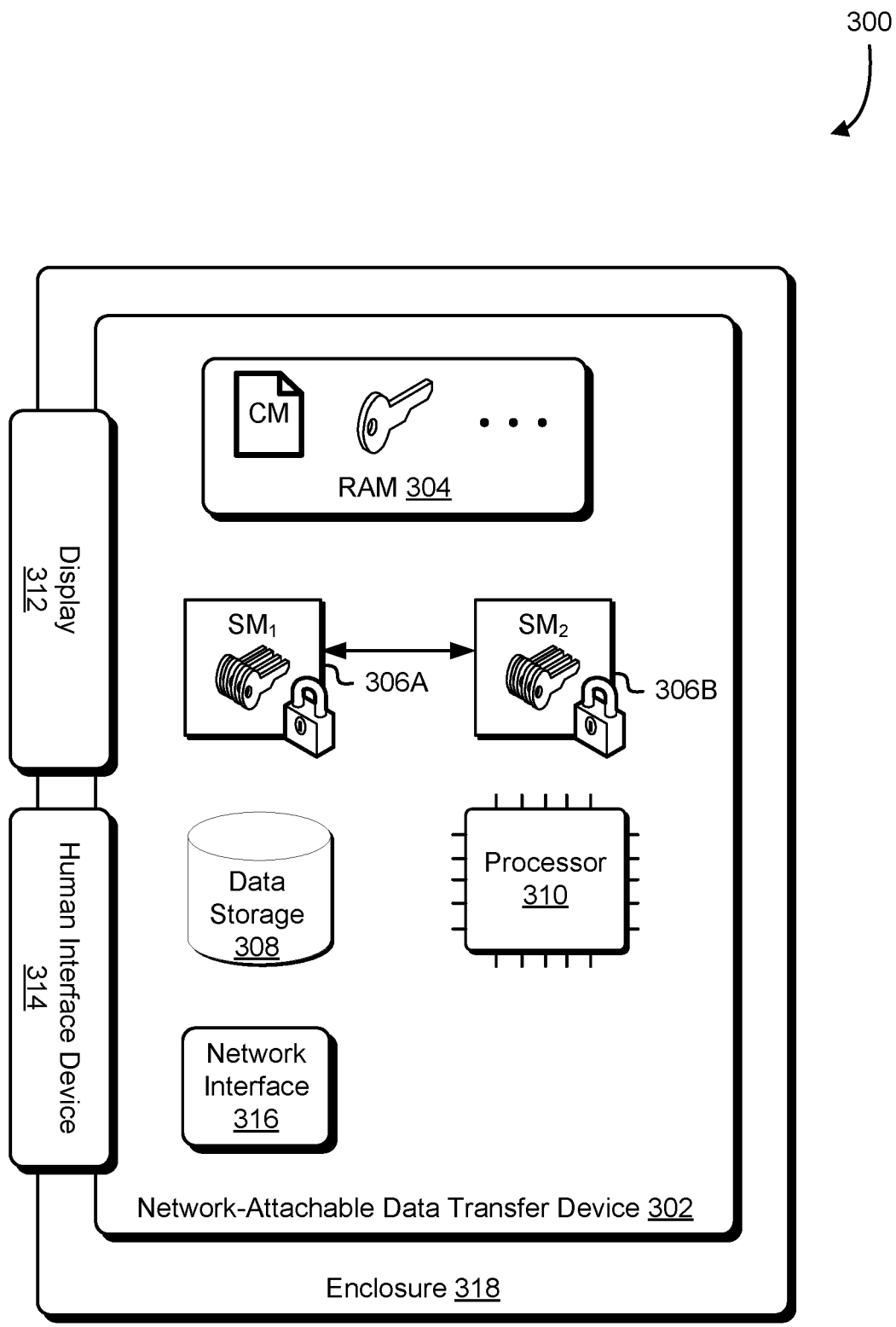
FIG. 3 shows an illustrative example of network-attachable data transfer devices in accordance with various embodiments.

FIG. 3 illustrates a diagram 300 of a network-attachable data transfer device 302 and components that may be included therein. The diagram 300 illustrates various components and modules that may be included in a network-attachable data transfer device. The network-attachable data transfer device 302 shown in FIG. 3 may be in accordance with those described elsewhere in this disclosure. The devices may be configured with fewer or additional components and/or modules. Some components and/or modules may be replaced by other suitable components and/or modules. An example of a network-attachable data transfer device 302 may include components such as, but not limited to: random access memory (RAM) 304; one or more security modules 306A and 306B; persistent data storage 308; a processor 310; an electronic display 312; a human interface device 314; and a network interface 316. The network-attachable data transfer device may be enclosed in a tamper-proof enclosure 318.

A network-attachable data transfer device 302 may be configured to have volatile memory such as RAM 304. Any suitable form of volatile memory may be used in place of and/or in addition to RAM, such as registers, caches, and other types of temporary storage. In some embodiments, the contents stored in volatile memory such as RAM 304 are erased as a result of the network-attachable data transfer device 302 losing power (e.g., the device rebooting as a result of a loss of power, even temporary). Data stored in volatile memory may be maintained based at least in part on the device maintaining power—the data may be lost when the device loses power even, in some cases, as a result of temporary and/or intermittent power loss of the device. In an unlocked network-attachable data transfer device, the RAM may be configured to store a cluster manifest 320 and cryptographic material such as a cryptographic key 322 that may be obtained from an encrypted payload of the cluster manifest using techniques described above in connection with FIGS. 1-2. The cryptographic key 322 may be used by the network-attachable data transfer device 302 to perform one or more features, functions, operations, requests, and the like. FIG. 3 illustrates a network-attachable data transfer device 302 in an unlocked state, which may be indicated by the presence of the cryptographic key 322 which may be obtained from a cluster manifest 320 as part of an unlock procedure. In some embodiments, the cluster manifest 320 is obtained by retrieving a locked manifest (e.g., from persistent data storage 308) and unlocking the locked manifest using information provided by a customer (e.g., via a human interface device 314). In some embodiments, the cluster manifest 320 is obtained from another device of the cluster.

A network-attachable data transfer device 302 may be configured with one or more security modules such as the security modules 306A and 306B shown in FIG. 3. A security module may be a trusted platform module (TPM), physically unclonable function (PUF), hardware security module (HSM), and the like. In some embodiments, a security module is a physical computing device that safeguards cryptographic keys by storing them within a tamper-resistant physical device. Security modules may be used for cryptographic key generation and storage, and to perform cryptographic operations for authorized clients of the security module. In general, the cryptographic keys are not exportable from the security module in an unprotected form. In some embodiments, a security module is configured to perform a cryptographic operation such that an input value and an output value have different fixed sizes. For example, where the cryptographic operation is an encryption operation, the input plaintext may be of a first fixed size (e.g., 254 bytes) and may generate an output ciphertext that is of a second fixed size (e.g., 312 bytes). Conversely, a decryption operation may accept an input ciphertext that is 312 bytes in size and generate a corresponding output plaintext that is 254 bytes in size. A security module may be configured to perform various types of cryptographic operations such as encrypting data, decrypting data, verifying authenticity of data, and more. Encryption and decryption operations may be extended to support authenticated encryption and authenticated decryption, respectively. A security module that has been tampered with or been subject to an attempted tampering may be unable to perform cryptographic operations.

In some embodiments, a network-attachable data transfer device may have multiple motherboards each having a security module that is used to encrypt a part of a cryptographic key.

In some embodiments, authenticity of a security module is verified by successfully decrypting a ciphertext. For example, in connection with FIG. 2, a security module that was able to successfully decrypt a partition attests to the authenticity of the security module and verifies that the security module was not tampered with and is in working condition. Security modules may have interconnects that allow the security modules of a network-attachable data transfer device to securely communicate with each other (e.g., the interconnect includes tamper-resistant capabilities such that measurement of signals such as electrical signals across the interconnect is not possible without detection). It should be noted that while FIG. 3 depicts an interconnect between security modules 306A and 306B connection, other connections between components may exist but have been omitted for clarity.

In some embodiments, the network-attachable data transfer device 302 is further configured with one or more persistent data storage 308 components. Persistent data storage media may include non-volatile storage such as hard drives, tape drives, magnetic drives, non-volatile flash memory, and the like. A persistent storage medium may be configured to store large amounts of encrypted data (e.g., from a large data store such as a customer storage system) during shipment from one data facility to another data facility. In some embodiments, the network-attachable data transfer device 302 receives the data to be stored via a network connection accessible through the enclosure 318 and configured to provide access to the persistent storage medium as a network-attached storage device. In some examples, the network-attachable data transfer device 302 receives the data to be store from another cluster device via a communication session such as a cryptographically protected communication session (e.g., TLS session). In some embodiments, the persistent data storage 308 is configured to operate in connection with the persistent data storage of other network-attachable data transfer devices in a cluster. For example, in some embodiments, data is striped (e.g., in a RAID 0 configuration) between persistent storage media across multiple media within and/or across multiple network-attachable data transfer devices of a cluster. As a second example, data may be mirrored (e.g., in a RAID 1 configuration) between persistent storage media across multiple media within and/or across multiple network-attachable data transfer devices of a cluster. Data may be organized and/or partitioned in various ways—for example, each persistent storage medium may be used to store a database shard of a database.

A network-attachable data transfer device 302 may have one or more processors 310 such as central processing units (CPUs) that may be configured to perform cryptographic operations. In some embodiments, a network-attachable data transfer device 302 has one or more motherboards that are each configured with one or more processing units such as the processor 310 illustrated in FIG. 3. Furthermore, in some embodiments, each of the motherboards includes at least one security module.

The network-attachable data transfer device 302 may also include an outward-facing electronic display 312. The electronic display may be used to display a destination location (e.g., in lieu of a shipping label). The display 312 may incorporate various types of display technologies such as low-power electronic-ink (e-ink), organic light emitting diodes (OLED), active-matrix organic light-emitting diode (AMOLED), flexible displays, and other such technologies. The display may further be a touch-screen display that a customer may interact with using a finger, stylus, or other input device. The network-attachable data transfer device 302 may be configured with multiple displays using multiple display technologies. The display may be visible to a customer, postal employee, etc. through the protective exterior enclosure 318.

A human interface device (HID) 314 may also be included as part of a network-attachable data transfer device 302. The human interface device 314 may be used to unlock the device—for example, a customer may unlock a device by: entering a password into an alphanumeric keyboard or display device (e.g., touchscreen); entering a personal identification number (PIN) or unlock code; performing a biometric verification using, for example, speech, fingerprint, and/or iris recognition using one or more sensors. Embodiments in accordance with this disclosure may use any combination of the techniques described herein as part of a process for unlocking a network-attachable data transfer device 302. A touchscreen display may be a human interface device. A locked network-attachable data transfer device may receive the verification data (password, PIN code, fingerprint data, etc.), perform an authentication process (e.g., verify that the provided password matches the user account associated with the device and/or unlock), and then unlock the device. The verification data may be used as part of a decryption process where an encrypted cluster manifest is decrypted and made available for use by the system.

The network-attachable data transfer device 302 may further include a network interface 316. The network interface may be used as an interface between an external network (e.g., a computer network or a service provider network) and the network-attachable data transfer device 302. In some embodiments, the network interface is used to communicate with other devices of a cluster in an ad-hoc manner—for example, various types of decentralized ad hoc networks. In some embodiments, the network interface uses a wireless interface such as a Wi-Fi network or a cellular network.

The network-attachable data transfer device 302 may have a tamper-proof enclosure 318 that acts as an enclosure to protect the device from being physically tampered with. The enclosure may be used to physically deny access to various internal components and modules such as RAM, security modules, one or more persistent storage media, and processing units, network interfaces, data stored on any of the above components, and more. In some embodiments, the enclosure 318 is made of hardened materials and may be ruggedized in accordance with one or more military standards and/or electronics industry standards. The enclosure may prevent access to internal components while simultaneously allowing access to other components, such as a display and/or human interface device that a customer may interact with. The enclosure 318 may have sensors for detecting kinetics to detect physical treatment of the device, such as sensors for measuring force, accelerometers, gyroscopes, etc. The enclosure may further be equipped with CPU and/or memory to monitor sensors. Conditions detected by the enclosure may cause the system to enter a locked state—for example, detection of the device being subject to strong forces may indicate an attempt to tamper with the device (e.g., by breaking open the enclosure to access internal components).

While various components of a network-attachable data transfer device have been illustrated in FIG. 3, the network-attachable data transfer device may be configured with various components added, removed, modified, or some combination thereof. For example, a network-attachable data transfer device may further include geolocation sensors such as a global positioning system (GPS) receiver that may be used as part of determining a shipping address to display. The GPS receiver may also be used to lock the device if it is determined the device is not in an expected geolocation or that the device is not within a prescribed distance from an expected path that the shipment of the device is expected to take.

In some embodiments, the network-attachable data transfer device includes ports and other peripheral connectors that may allow for additional functionality. For example, peripherals may be attached to the network-attachable data transfer device via a hardware attachment port such as a universal serial bus (USB) that may be accessible through the enclosure 318. In some embodiments, the system supports USB-pluggable security devices such as a portable hardware authentication device that may function as a security module. For example, in some cases, a portable hardware authentication device may be used to decrypt a partition of an encrypted data entry as part of the process for obtaining a cryptographic key encoded in the encrypted data entry. In this way, possession of a portable hardware authentication device may be required to obtain a cryptographic key from an encrypted data entry and/or obtain access to the decrypted contents of an encrypted payload.

Figure 4:
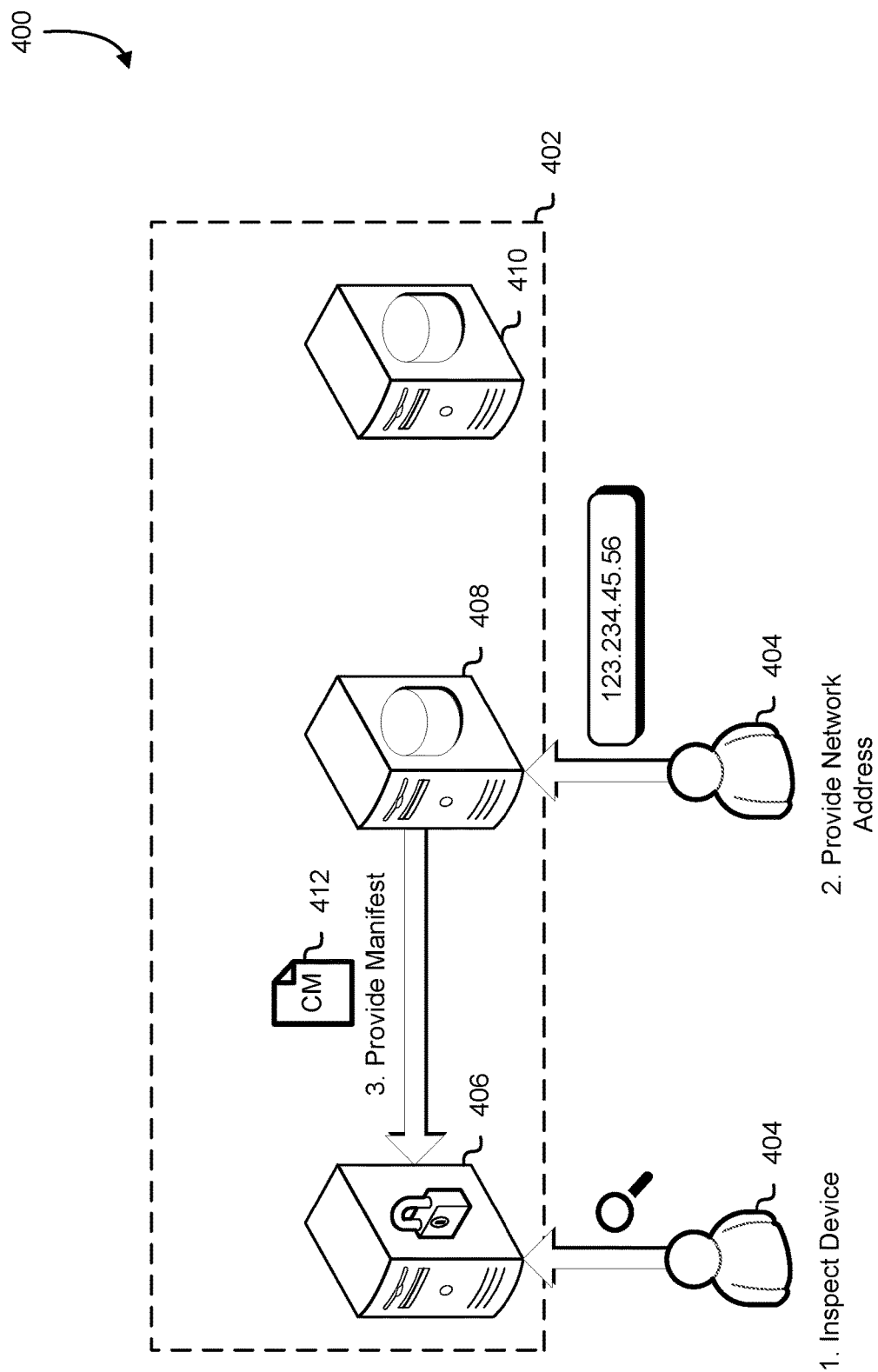
FIG. 4 shows an illustrative example of an environment in which a customer may interact with devices of a cluster of network-attachable data transfer devices.

FIG. 4 is an illustrative example of an environment 400 in which a locked device of a cluster may be unlocked. In an embodiment, a cluster 402 of network-attachable data transfer devices 406, 408, and 410 may communicate with each other. In FIG. 4, the leftmost network-attached data storage device 406 may be in a locked state. In some embodiments, the environment 400 arises when a device is received (e.g., via shipment). While the cluster 402 shown in FIG. 4 illustrates several devices, a cluster may, generally speaking, include less devices. In some cases, a cluster includes one device or two devices.

A customer 404 may receive the network-attachable data transfer device 406 and inspect the system both physically and programmatically prior to unlocking the network-attachable data transfer device and joining it to a cluster network. Physical inspection of a network-attachable data transfer device may involve a customer visually and/or physically inspecting the device to determine whether there are any indications that the device has been tampered with. Indications of physical tampering may include physical damage to the exterior of the device, indications of forced entry to the internal components of the device such as broken locks, joints, etc., and indications that tamper-proof or tamper-evident seals have been broken. Programmatic inspection may include running diagnostics tools on the network-attachable data transfer device, ensure the correct software and hardware components are installed, verify digital signatures associated with device drivers, run performance metrics (e.g., to ensure that malware has not degraded the performance of the system), and more. A locked network-attachable data transfer device may lack access to cryptographic material such as a cryptographic key that enables the locked network-attachable data transfer device to perform one or more features, functions, operations, requests, etc.

After inspecting the network-attachable data transfer device 406, the customer 404 may determine that the network-attachable data transfer device 406 has not been tampered with and should be unlocked. Various techniques such as those described above in connection with FIGS. 1-3 may be employed, as well as those described herein. For example, a customer (either the same or different customer who inspected the device) may instruct another device of the cluster 402, such as the network-attachable data transfer device 408 show in FIG. 4, to unlock the network-attachable data transfer device 406 by providing, to the network-attachable data transfer device 408, a network address of the network-attachable data transfer device to be unlocked. The network address may be in accordance with various standards and protocols, such as an internet protocol version 4 (IPv4) address, an internet protocol version 6 (IPv6) address, a media access control address, and various other types of information that may enable interfacing between devices. The network address may be provided as part of a request, such as an application programming interface (API) request, to instruct the device associated with the network address to perform an unlock and/or authentication procedure. The network-attachable data transfer device 408 receiving the instruction may provide a cluster manifest 412 to the network-attachable data transfer device 406 specified in the network address. The network-attachable data transfer device 406 may receive the cluster manifest 412 and perform an unlock process using the manifest, for example, using techniques described above in connection with FIG. 4. The same set of steps may be performed to unlock other devices of a cluster (not show in FIG. 4) Thus, FIG. 4 illustrates an alternative process for unlocking one or more locked devices of a network. For example, in a scenario where a customer receives multiple locked devices as part of a shipment/delivery, the customer may individually inspect each locked network-attachable data transfer device and then use an unlocked device 408 to issue unlock commands to each of the locked network-attachable data transfer devices. In some embodiments, a bulk command is issued by an unlocked network-attachable data transfer device (e.g., the network-attachable data transfer device 408 described above) to unlock two or more locked network-attachable data transfer devices.

Figure 5:
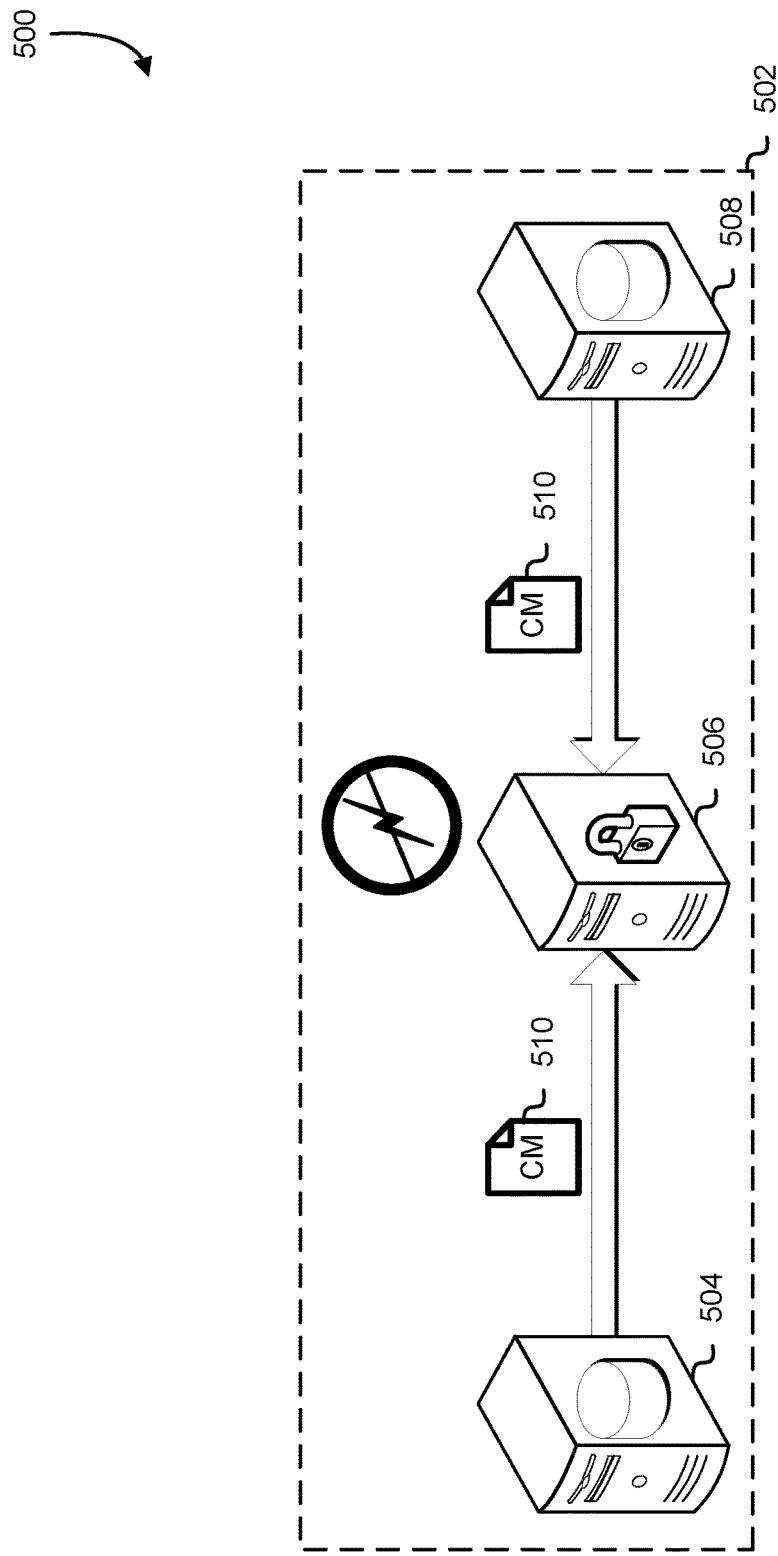
FIG. 5 shows an illustrative example of an interaction between two cluster devices.

FIG. 5 is an illustrative example of an environment 500 in which a locked device of a cluster may receive a cluster manifest that may be used to perform an unlock and/or authentication procedure without requiring the assistance of a customer. The environment 500 illustrates a cluster 502 of network-attachable data transfer devices where there are two devices 504 and 508 operating in an unlocked mode and one device 506 that is locked. The network-attachable data transfer device 506 may be locked as a result of a temporary power outage (denoted by the lightning strike) that may have caused the network-attachable data transfer device 506 to reboot and lose state information, causing the network-attachable data transfer device 506 to be locked. In some embodiments, a loss of power results in a cluster manifest and/or cryptographic material stored in volatile memory (e.g., RAM) to be lost. As a result of losing the cluster manifest and cryptographic material that may be required to perform certain operations, the network-attachable data transfer device 506 may enter a locked mode. In some examples, the cluster manifest and cryptographic material are stored strictly in volatile storage (e.g., RAM) and not in non-volatile storage that is persisted through reboots. Software, hardware, or a combination thereof may be used to enforce the constraint that certain data such as the cluster manifest is not persisted in non-volatile storage media.

In some embodiments, either a first network-attachable data transfer device 504, a second network-attachable data transfer device 508, another device of the cluster 502, or some combination thereof detects that a network-attachable data transfer device 506 is in a locked state. In some cases, the detection occurs as part of periodically polling a network to determine whether a device is still available (e.g., by sending a ping to the device). In other embodiments, a device of a cluster 502 sends a "heartbeat" (e.g., a message or other information indicating that the device is in a particular state) to other devices of the cluster. The lack of a heartbeat over an extended period of time may indicate that a device has gone offline and may result in diagnostics measures to be performed to determine whether the device may have entered a locked state (e.g., as a result of an unexpected reboot). Upon detecting that the network-attachable data transfer device 506 is in a locked state, another device of the cluster 502 may provide an unlocked cluster manifest 510 to the network-attachable data transfer device 506. The cluster manifest 510 may be transmitted over a secure connection (e.g., TLS session), but it is not necessarily the case that the transmission medium be a secured connection. Upon receiving the cluster manifest 510, the network-attachable data transfer device 506 may use the manifest to perform an unlock procedure and obtain cryptographic material to perform one or more features, functions, operations, requests, etc., and transition to an unlocked state. The cluster manifest 510 may further be used to authenticate that one or more security modules of the network-attachable data transfer device 506 have not been tampered with.

Figure 6:
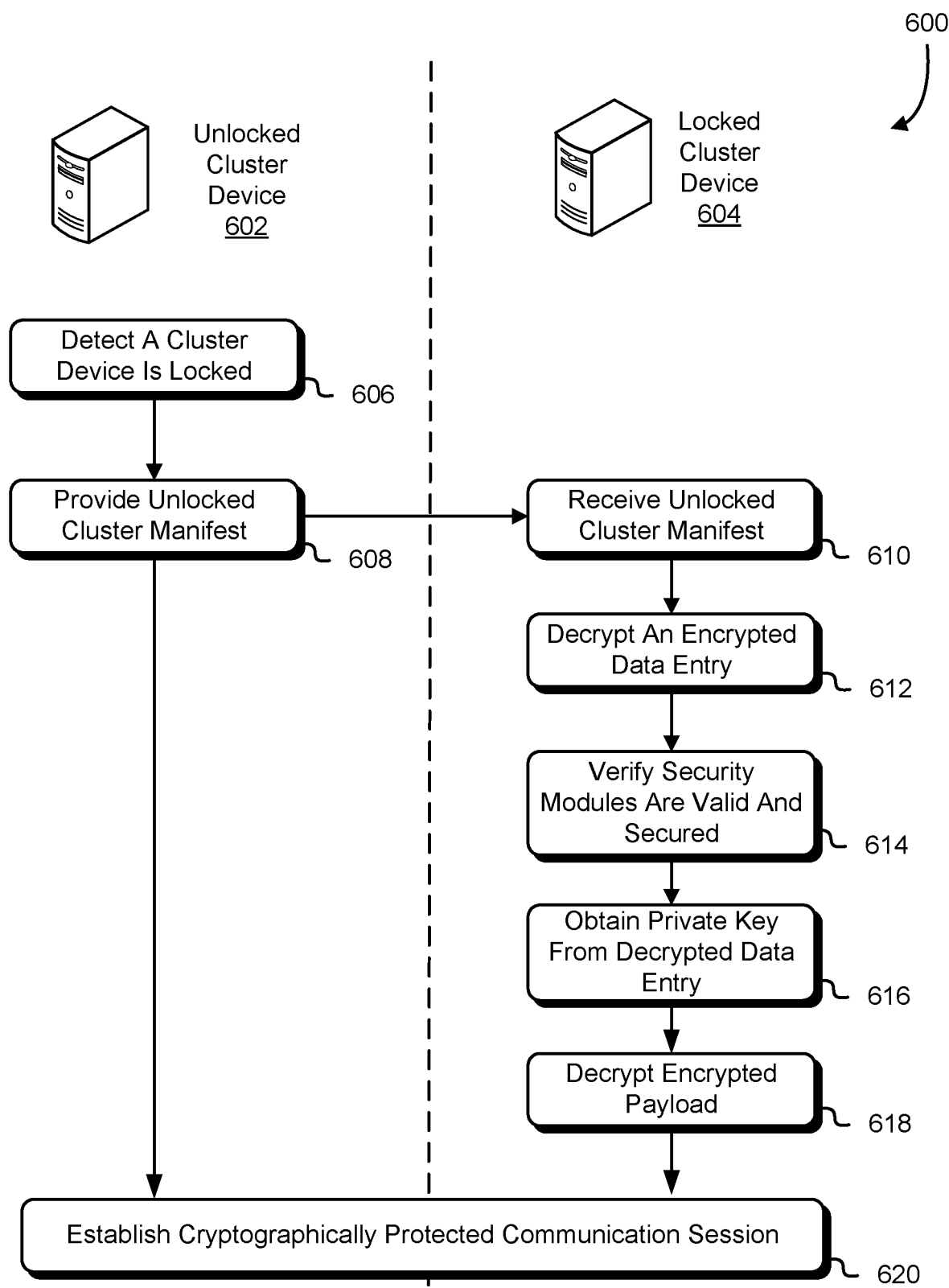
FIG. 6 shows an illustrative example of a diagram illustrating an interaction between an unlocked cluster device and a locked cluster device in accordance with various embodiments.

FIG. 6 illustrates a diagram 600 of an interaction between an unlocked cluster device 602 and a locked cluster device 604. The cluster devices may be those in accordance with embodiments described elsewhere in the disclosure. An unlocked cluster device 602 such as those described in accordance with embodiments of FIG. 5 may detect 606 that another device of the cluster is in a locked state. The detection may occur through a periodic polling mechanism, through detecting that an ongoing communication session between the devices has been interrupted, or any other suitable manner. As a result of detecting the cluster device is locked, the unlocked cluster device 602 may provide 608 an unlocked cluster manifest to the locked cluster device 604. In some embodiments, the cluster manifest is retained by the unlocked cluster device 602 in volatile memory such as RAM which may be erased or lost if the device loses power. The manifest may be provided to the locked cluster device 604 in any suitable manner, including transmission across a network.

The locked cluster device 604 may receive 610 the unlocked cluster manifest and perform one or more steps in connection with unlocking the device and/or authenticating the device. These steps may be performed in accordance with techniques described in connection with other figures of this disclosure. For example, the locked cluster device may obtain, from the cluster manifest, encrypted data that, when decrypted 612, encodes cryptographic material such as a cryptographic key. The encrypted data may have one or more partitions such that each partition is decryptable using a security module of the locked cluster device 604. The system may decrypt the partitions and assemble a cryptographic key using techniques described above in connection with FIG. 1. In some embodiments, an authenticated encryption mode is used such that the decryption includes performing an authentication using a ciphertext and authentication tag, which may be supplied via a partition.

The system may verify 614 the security modules are valid and secured, for example, by checking that the security modules are each operable to perform cryptographic operations. It should be noted that verification that the security modules are valid and secured does not necessarily imply that the cryptographic operations complete without error. For example, in a case where authenticated encryption is used and a decryption operation supplies an input ciphertext and an authentication tag that does not match the input ciphertext, an error may be returned—such an error may indicate that the security module is secured and operating correctly because the security module was able to perform cryptographic operations in making the determination that the ciphertext and tag do not match, thereby returning an error.

In some embodiments, a cryptographic key is assembled 616 from the decrypted partitions of the encrypted data. The cryptographic key may be assembled as described above in connection with FIGS. 1-6. The system may then decrypt 618 an encrypted payload, such as an encrypted payload included in the manifest that is associated with the particular device, and may use at least part of the decrypted payload to establish 620 a cryptographically protected communication session with the unlocked cluster device 602. The establishing of the session may be a part of the process for the locked cluster device to re-join the cluster. In some embodiments, communication sessions is established with other devices of the cluster in place of and/or in addition to any communication sessions established with the unlocked cluster device 602.

Figure 7:
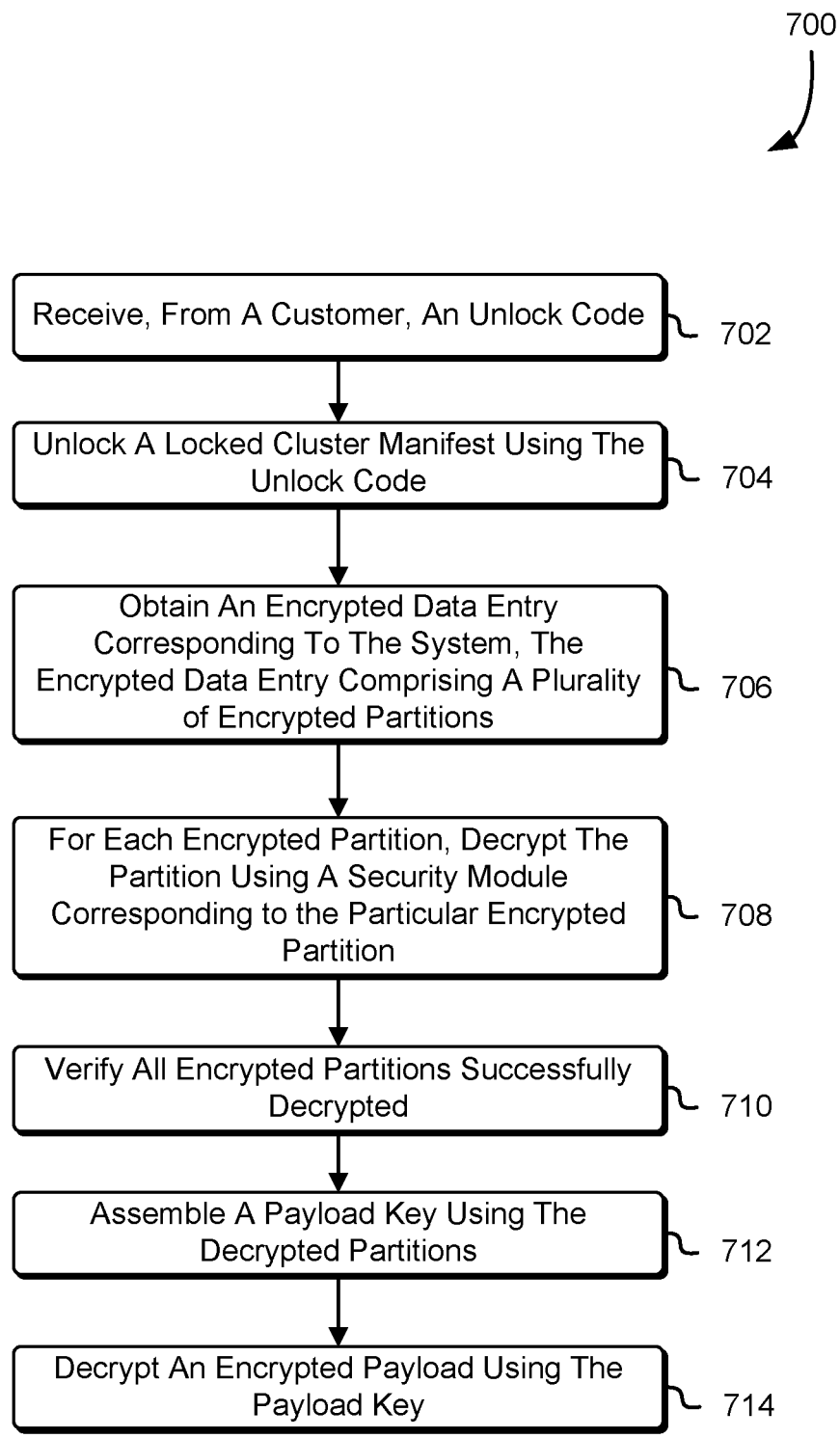
FIG. 7 shows a diagram illustrating a process for unlocking a cluster device using a locked cluster manifest.

FIG. 7 shows an illustrative example of a process 700 for unlocking a network-attachable data transfer device using a locked cluster manifest. Generally, the process 700 may be performed by any suitable network-attachable data transfer device such as a network-attachable data transfer device that is operating as part of a cluster but does not otherwise obtain access to an unlocked manifest (e.g., through the process described below in connection with FIG. 8). In an embodiment, the process 700 includes receiving 702 an unlock code from a customer. The system performing the process 700 may also receive a locked cluster manifest from the customer or, alternatively, may retrieve a locked manifest that may be stored in a persistent storage medium of the system. In some embodiments, the system is configured to not store and/or prohibit storage of an unlocked cluster manifest in persistent storage media.

The system may unlock 704 the locked cluster manifest using the unlock code, for example, by using the unlock code as a cryptographic key to perform a decryption operation on the locked manifest as a ciphertext. The system may then further obtain 706 an encrypted data entry from the cluster manifest, where the encrypted data entry may include one or more partitions—for example, as described above in connection with FIG. 2. The encrypted data entry may be obtained from the cluster manifest by using an identifier associated with the system which has a mapping to a corresponding encrypted data entry. For each partition, the system may decrypt 708 the partition using a security module corresponding to the partition. The system may further verify 710 that all of the partitions were successfully decrypted. This may include determining that the security modules used to perform the decryption operations are valid and authentic. The system may also assemble 712 a payload key using the decrypted partitions, for example, using techniques described above. It should be noted that the order of the events shown in this process may be interchangeable and that the specific ordering shown in FIG. 7 are illustrative in nature. The system may, after assembling the payload key, use the payload key to decrypt 714 an encrypted payload associated with the system.

Figure 8:
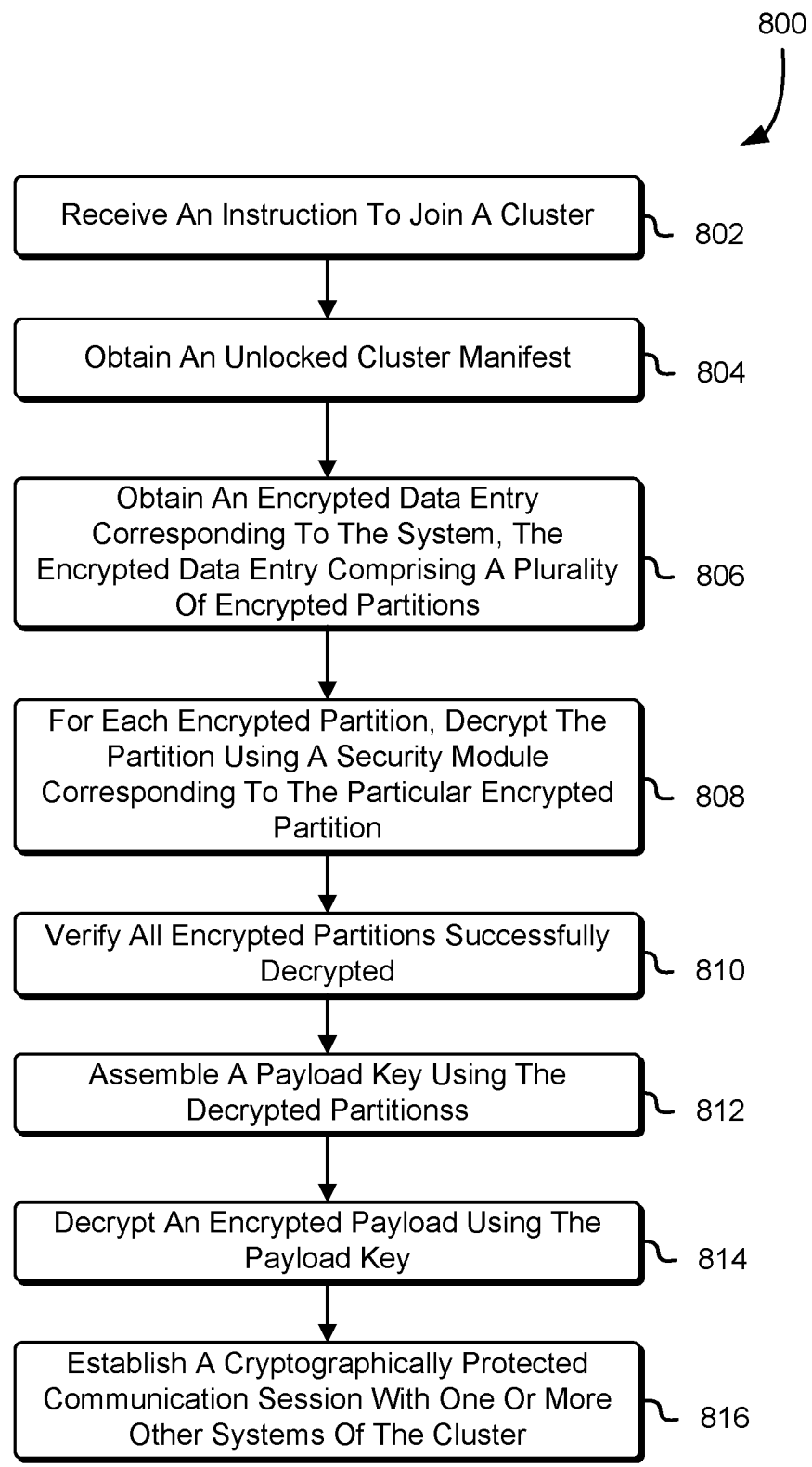
FIG. 8 shows a diagram illustrating a process for joining a device to a cluster using an unlocked cluster manifest.

FIG. 8 shows an illustrative example of a process 800 for programmatically unlocking a network-attachable data transfer device. Generally, the process 800 may be performed by any suitable network-attachable data transfer device such as a network-attachable data transfer device that is operating as part of a cluster but does not otherwise obtain access to an unlocked manifest (e.g., through the process described below in connection with FIG. 8). In an embodiment, the process 800 includes receiving 802 an instruction to join (or re-join) a cluster. The instruction may be received in the form of a network request, an API call, or other suitable format. The system may obtain 804 an unlocked cluster manifest. In some embodiments, the unlocked cluster manifest is included as part of the instructions to join the cluster. In some embodiments, the instruction to join the cluster further includes information on how to obtain the unlocked cluster manifest, such as by including a uniform resource locator (URL), uniform resource identifier (URI), network path location, and so on where the cluster manifest may be located. In some embodiments, a network-accessible data storage provider is utilized to store the cluster manifest and the system has access to the cluster manifest stored via the network-accessible data storage provider. While some embodiments may receive an instruction to join a cluster, some embodiments may, either instead or alternatively, detect a condition indicating that the system should join the cluster. For example, the system may detect that it has power cycled (e.g., rebooting from an intermittent power failure) and still has access to network information that may be used to communicate with other devices on the cluster. In such a scenario, the system may use the detection of the power cycle to determine that the system should then obtain a cluster manifest as described in connection with FIG. 8.

After obtaining the cluster manifest, the system may obtain 806, from the cluster manifest, an encrypted data entry that, when decrypted, encodes a cryptographic payload key. The encrypted data entry may have one or more partitions that are each encrypted (and decryptable) using security modules of the system. For each partition, the system may decrypt 808 the partition using the appropriate security module to obtain a decrypted partition. The system may, after decrypting each of the partitions, verify 810 that all of the partitions were successfully decrypted. The system may assemble 812 a cryptographic payload key from the decrypted partitions. These steps may be performed in accordance with techniques described above in connection with FIGS. 1-7.

The cryptographic payload key may be used to decrypt 814 an encrypted payload associated with the system, which may further contain data such as cryptographic material (e.g., a cryptographic key) that may be used to perform one or more features, functions, operations, requests, etc., and may indicate that the system is in an unlocked state. The system may additionally establish 816 a cryptographically protected communication session with one or more other systems of the cluster. Various alternatives and/or extensions to the process 800 described herein are contemplated and may incorporate techniques disclosed above in connection with FIGS. 1-7.

In various embodiments, sessions may be cryptographically protected communication sessions used for the purpose of accessing resources. The cryptographically protected communication sessions may be used, for example, for the transfer of data from one entity to another such as from a client to a server or from the client to the server. The cryptographically protected communication session may be used, for instance, to ensure integrity of the data traversing a network between the entities and/or to ensure confidentiality of the data as it traverses the network. As an example, a TLS session is a cryptographically protected communication session. Note that the techniques of the present disclosure area are also adaptable to other protocols, including other protocols that do not necessarily utilize cryptography. Generally, the techniques are applicable to any protocol that involves a negotiation of parameters, such as HyperText Transfer Protocol 2 (HTTP/2) and other protocols that involve handshakes for the purpose of negotiating sessions.

Figure 9:
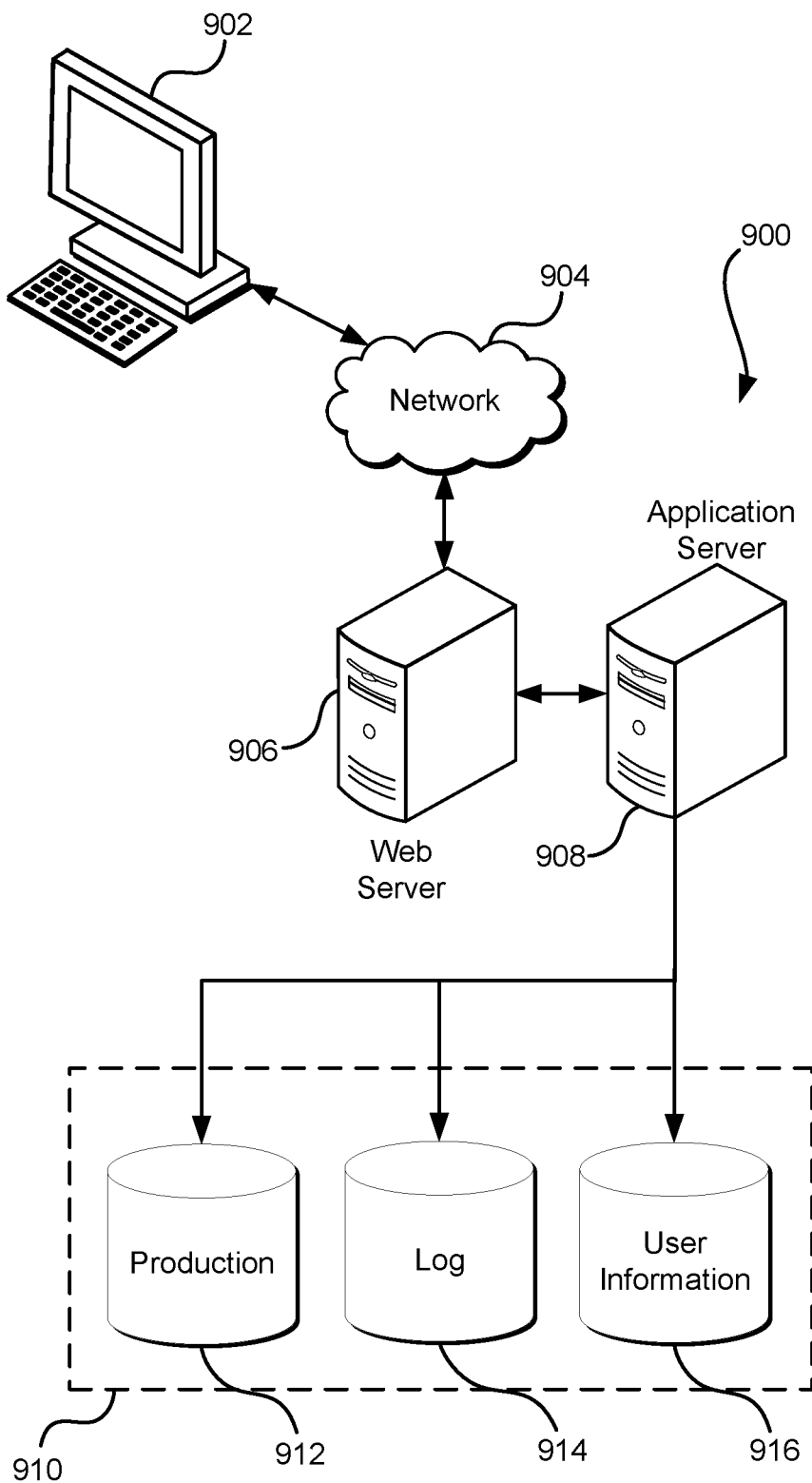
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A network-attachable data transfer device, comprising:
   a persistent storage medium;
   a network interface that provides access to the persistent storage medium as a network-attached storage device;
   a first security module and a second security module;
   a processor; and
   memory that stores computer-executable instructions that, if executed, cause the network-attachable data transfer device to:
      obtain a manifest associated with a set of devices, the manifest comprising:
         an encrypted payload; and
         an encrypted data entry comprising a plurality of encrypted partitions of a cryptographic key, wherein:
            a first encrypted partition of the plurality of encrypted partitions is decryptable using a second cryptographic key that is programmatically unexportable from the first security module; and
            a second encrypted partition of the plurality of encrypted partitions is decryptable using a third cryptographic key that is programmatically unexportable from the second security module;
      obtain a plurality of partitions of the cryptographic key by at least decrypting the first encrypted partition using the first security module and decrypting the second encrypted partition using the second security module;
      assemble the cryptographic key from the plurality of partitions;
      decrypt the encrypted payload using the cryptographic key;
      join the set of devices using part of the decrypted payload, wherein joining the set of devices includes establishing a communication session with another device of the set of devices;
      obtain data via the network interface or the communication session; and
      store the obtained data using the persistent storage medium.

2. The network-attachable data transfer device of claim 1, wherein the computer-executable instructions to obtain the cryptographic key from the encrypted data entry include instructions that, if executed, cause the network-attachable data transfer device to:
   parse the encrypted data entry to identify at least a first partition of the encrypted data entry associated with the first security module and a second partition of the encrypted data entry associated with the second security module;
   decrypt the first partition using the first security module to obtain a first decrypted partition;
   decrypt the second partition using the second security module to obtain a second decrypted partition; and
   assemble the cryptographic key using at least part of the first decrypted partition and the second decrypted partition.

3. The network-attachable data transfer device of claim 1, wherein at least part of the decrypted payload is exclusively stored in volatile memory associated with the network-attachable data transfer device, data stored in volatile memory being maintained based at least in part on the network-attachable data transfer device maintaining power.

4. The network-attachable data transfer device of claim 1, wherein:
   the memory stores computer-executable instructions that, if executed, further causes the network-attachable data transfer device to establish a connection with a portable hardware authentication device, wherein the portable hardware authentication device comprises a third security module that individually lacks sufficient cryptographic material to obtain the cryptographic key from the encrypted data; and
   the cryptographic key is obtained from the encrypted data entry using at least the first security module, the second security module, and the third security module.

5. A computer-implemented method, comprising:
   obtaining a manifest associated with a set of devices, the manifest comprising:
      an encrypted payload; and
      encrypted data comprising at least a first encrypted partition and a second encrypted partition, wherein the encrypted data, when decrypted, encodes a cryptographic key, wherein a first security module and a second security module individually lack sufficient cryptographic material to obtain the cryptographic key from the encrypted data;
   obtaining the cryptographic key from the encrypted data using at least the first security module and the second security module by at least decrypting the first encrypted partition using the first security module and decrypting the second encrypted partition using the second security module;
   decrypting the encrypted payload using the cryptographic key; and
   joining the set of devices using at least part of the decrypted payload.

6. The computer-implemented method of claim 5, wherein the manifest further comprises a second encrypted payload associated with a different device of the set of device and further wherein the second encrypted payload is inaccessible by the first security module and the second security module.

7. The computer-implemented method of claim 5, wherein obtaining the manifest further includes receiving, from the device of the set of devices, the manifest.

8. The computer-implemented method of claim 5, wherein:
   obtaining the manifest further includes receiving a network address as part of the instruction to join the set; and
   the manifest is accessible using at least the network address.

9. The computer-implemented method of claim 5, wherein:
   the manifest further comprises an identifier and a mapping between the identifier and the encrypted data; and
   the computer-implemented method further comprises identifying the identifier from a plurality of identifiers and using the mapping to obtain the encrypted data.

10. The computer-implemented method of claim 5, wherein:
the encrypted payload, when decrypted, comprises a second cryptographic key; and
the computer-implemented method further comprises:
receiving a request to persist data;
performing a cryptographic operation, using at least the second cryptographic key, on the data to generate an output; and
storing the output in a persistent storage medium.

11. The computer-implemented method of claim 5, wherein the instruction is received as an application programming interface (API) request.

12. The computer-implemented method of claim 5, wherein joining the set of devices comprises establishing a cryptographically protected communication session with a device of the set.

13. A non-transitory computer-readable storage medium having stored thereon executable instructions that, as a result of being executed by one or more processors of a system, cause the system to at least:
obtain a manifest associated with a set of devices, the manifest comprising:
an encrypted payload that, when decrypted, is operable to cause the system to unlock functionality of the system; and
encrypted data that, when decrypted, encodes a cryptographic key;
perform an authentication of a first security module of the system and a second security module of the system by at least performing a cryptographic operation using a respective security module and information based at least in part on the encrypted data;
obtain the cryptographic key by at least decrypting a first encrypted partition using the first security module and decrypting a second encrypted partition using the second security module;
decrypt the encrypted payload using the cryptographic key; and
join the set of devices using at least part of the decrypted payload.

14. The non-transitory computer-readable storage medium of claim 13, wherein the manifest and decrypted payload are stored exclusively in volatile memory.

15. The non-transitory computer-readable storage medium of claim 13, wherein the encrypted payload, when decrypted, comprises a second cryptographic key, the second cryptographic key operable to unlock at least some of the functionality of the system.

16. The non-transitory computer-readable storage medium of claim 13, wherein the manifest is obtained as part of a request to join the set of devices.

17. The non-transitory computer-readable storage medium of claim 13, wherein the manifest further comprises an identifier and a mapping between the identifier associated with the system and the encrypted data.

18. The non-transitory computer-readable storage medium of claim 13, wherein the executable instructions further cause the system to detect another device of the set of devices is in a locked state and, in response, provide an instruction to the another device to join the set, the instruction comprising the manifest.

19. The non-transitory computer-readable storage medium of claim 13, wherein the executable instructions that cause the system to obtain the cryptographic key further cause the system to authenticate the first security module and the second security module to obtain the first partition and the second partition.

20. The non-transitory computer-readable storage medium of claim 13, wherein the first security module is a trusted platform module (TPM).

* * * * *